United States Patent [19]

Peška et al.

[11] 3,959,236

[45] May 25, 1976

[54] POLYMERS AND COPOLYMERS OF HYDROXYALKYL METHACRYLATE SULFO ESTERS AND THE METHOD FOR THEIR MANUFACTURING

[75] Inventors: Jan Peška; Milan Beneš; Jiří Štamberg, all of Prague, Czechoslovakia

[73] Assignee: Ceskoslovenska akademie ved, Prague, Czechoslovakia

[22] Filed: Aug. 8, 1974

[21] Appl. No.: 495,641

[30] Foreign Application Priority Data
Aug. 15, 1973 Czechoslovakia .................. 5754-73

[52] U.S. Cl. ..................... 260/79.3 M; 204/159.16
[51] Int. Cl.² ................... C08F 28/02; C08G 75/24
[58] Field of Search ............. 260/79.3 M, 79.3 MU; 204/159.16

[56] References Cited
UNITED STATES PATENTS

| 3,033,833 | 5/1962 | Le Fevre et al. ............ 260/79.3 MU |
| 3,053,806 | 9/1962 | La Combe et al. ......... 260/79.3 MU |
| 3,260,707 | 7/1966 | Caldwell et al. ............ 260/79.3 MU |
| 3,349,063 | 10/1967 | Mayer et al. ................ 260/79.3 MU |
| 3,408,338 | 10/1968 | Szita et al. .................. 260/79.3 MU |
| 3,541,059 | 11/1970 | Schaper ...................... 260/79.3 MU |
| 3,592,655 | 7/1971 | Dykstra ....................... 260/79.3 MU |
| 3,770,801 | 11/1973 | Emmons et al. ............ 260/79.3 MU |

FOREIGN PATENTS OR APPLICATIONS
704,373 2/1965 Canada ....................... 260/79.3 M Primary Examiner—Ronald W. Griffin
Attorney, Agent, or Firm—Murray Schaffer

[57] ABSTRACT

The invention relates to chemically reactive polymers and copolymers of hydroxyalkyl methacrylate sulfo esters with monomer units of the formula

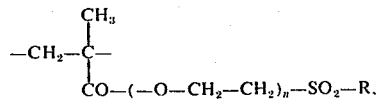

where $n$ is an integer equal to 1 or 2 and R is $C_6H_5-$, $p-CH_3C_6H_4-$, or $CH_3-$ and to the method of manufacturing the technically useful articles from these polymers, namely crosslinked beads, membranes, blocks, etc., by free-radical polymerization or copolymerization in bulk, solution or in two-phase aqueous dispersion system under conditions whereby the hydrolysis of the sulfo ester is suppressed.

11 Claims, No Drawings

POLYMERS AND COPOLYMERS OF HYDROXYALKYL METHACRYLATE SULFO ESTERS AND THE METHOD FOR THEIR MANUFACTURING

The invention relates to polymers and copolymers of hydroxyalkyl methacrylate sulfo esters which contain monomer units of the general formula

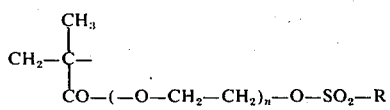

where $n$ is an integer equal to 1 or 2 and R is a radical selected from the group consisting of $C_6H_5-$, $p-CH_3C_6H_4-$, and $CH_3-$, as well as to the method of their manufacture. Polymers which contain reactive functional groups represent objects of intense research at present. Among their numerous technical uses, important applications are e.g. bonding of biologically active components onto the polymeric matrix or as polymeric reagents employed in organic and biochemical syntheses. Numerous such polymers are known differing by their reactive groups which predetermine the special applications of the polymers. Chloromethylated crosslinked polystyrenes subjected to further reactions of the chloromethyl groups have been mainly used for similar purpose up to the present time. This procedure is more economical than the preparation of polymers according to the invention, however its disadvantage is that chloromethylation represents hazardous step from the standpoint of occupational hygiene. This operation tends therefor to be restricted because of the hazard of chemical poisoning. The polymers according to the invention represent another original variant for solution of this common problem. Their advantage, besides the absence of hazardous operation, consists in their stability which permits a comfortable handling and unlimited storage under the normal conditions on the one hand and in their sufficient reactivity which is higher than that of chloromethylated polystyrene on the other.

The preparation of starting monomers has been already described in the Czechoslovak Pat. No. 150.825. However, it has turned out that the preparation of their polymers requires special precautions if they are to be obtained in a form suitable for technical application. The hydrolysis of aryl sulfonate occurs if the suspension polymerization is carried out in the common way and a spontaneous crosslinking with glycol dimethacrylate present in the monomer takes place during the solution polymerization at higher conversions. The object of this invention is to provide polymers and copolymers of hydroxyalkyl methacrylate sulfo esters which contain monomer units of the general formula

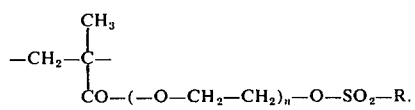

where $n$ and R have the above indicated meaning. These polymers and copolymers are prepared according to the invention by the free-radical polymerization of the aforesaid monomers or by their copolymerization with monomers polymerizable or copolymerizable by the free-radical mechanism, as e.g. styrene, lower alkyl methacrylates ($C_1$ to $C_4$), lower alkyl acrylates ($C_1$ to $C_4$), hydroxyethyl methacrylate, acrylamide, methacrylamide, acrylonitrile and methacrylonitrile. The polymerization or copolymerization is initiated according to the invention by common free-radical initiators, or by means of irradiation with UV light in the presence of suitable azo initiators or peroxide initiators alone or together with known photosensitizers, as e.g. benzoin, or also by lyophilic (monomer soluble) redox systems, e.g. peroxide compounds and aromatic amines, and the like. The polymerization or copolymerization according to the invention may be also carried out in the presence of a crosslinking agent which is soluble in the used monomer mixture and contains at least two polymerizable double bonds in the molecule, as e.g. methylenebisacrylamide, ethylene dimethacrylate, divinylbenzene, and the like. The above described polymers and copolymers may be prepared by suspension polymerization in a two-phase system using an intense stirring, by solution polymerization in a suitable solvent, e.g. dimethylacetamide, or by bulk polymerization. The soluble polymers are prepared by means of a suitable chain-transfer agent, for instance thioglycollic acid, chloroform, dodecyl mercaptan, etc., which compensates the effect of the present dimethacrylate on the one hand and controls the molecular weight on the other. Relatively large amounts of the initiator are used in the suspension polymerization to speed up the reaction at temperatures below 60°C and to suppress the hydrolysis degree from about 50% to about 3 % or less. The suspension polymerization method gives grains suitable for column packings.

Special-shaped products, as for instance membranes and foils, can be prepared by bulk polymerization in a mold. To prepare thin foils the polymerization is carried out between glass plates, at a temperature below 50°C. Heating to higher temperatures gives brittle membranes which are difficult to release from the mold walls. The reaction may be initiated by means of the UV light irradiation using a photosensitizer, as e.g. azobisisobutyronitrile. The resulting polymers may be advantageously subjected to the polymer analogous reaction with nucleophilic agents. Thus, nucleophilic alkylations proceed under conditions analogous to alkylation of low-molecular-weight sulfo esters. A series of polymers with various functional groups, e.g. $-NH_2$, $-NR_2$, $-NR_3^+Y^-$, $-J$, $-CN$, $-SCN$, $-N_3$, $-SC(NH_2)_2^+Y^-$, $-SH$, $-OR$, $OC_6H_5$, $-OCOR$, $-SCOCH_3$, $-OC_6H_4NHCOCH_3$, and the like, may be prepared from one common precursor by the simple method in this way.

The invention is further illustrated in several examples of performance without limiting its scope by any means.

EXAMPLE 1

A mixture consisting of 2.33 g of ethylene methacrylate benzenesulfonate (EMBS), 3.12 mg of azobisisobutyronitrile (ABIN) and 1.00 g of dimethylacetamide (DMAC) was heated to 70°C under an argon atmosphere in a sealed ampoule for 6 hr. The gel-like polymer was extracted with ethanol and ether and dried; 2.21 g(i.e. 95%) of the insoluble polymer was obtained.

EXAMPLE 2

A mixture consisting of 1.09 g of EMBS, 3.62 mg of ABIN and 2.18 g of DMAC was heated to 70°C for 30 min. The soluble polymer (0.36 g, 33%) was obtained by precipitation into ethanol; [$\eta$] = 0.64 (chloroform, 25°C).

EXAMPLE 3

A mixture consisting of 0.85 g of EMBS, 2.7 mg of ABIN, 5 ml of DMAC and 20 $\mu$l of chloroform was heated to 70°C for 9 hr. The soluble polymer (0.61 g, 72%) was obtained by precipitation into ethanol; [$\eta$] = 0.25 (chloroform, 25°C).

EXAMPLE 4

A mixture consisting of 1.00 g of ethylene methacrylate toluenesulfonate (EMTS), 5.02 mg of ABIN, 2 g of DMAC and 40 $\mu$l of 1% dimethylacetamide solution of thioglycollic acid was heated to 70°C for 1 hr. The soluble polymer (0.42 g, 42%) was obtained by precipitation into ethanol and drying, [$\eta$] = 0.22 (chloroform, 25°C).

EXAMPLE 5

A dispersion consisting of 0.90 g of EMBS, 0.10 g of ethylene dimethacrylate (EDMA), 100 mg of ABIN, 10 mg of poly(vinylalcohol) (PVA), and 8 g of water was stirred under argon at 60°C for 10 min. The resulting globules were filtered off, and washed with water, ethanol and ether. They weighed 0.98 g after drying and a fraction of 69% had the size 100 to 200 $\mu$m.

EXAMPLE 6

A dispersion consisting of 0.90 g of EMTS, 0.90 g of styrene, 0.10 g of divinylbenzene, 200 mg of ABIN, 15 mg of PVA, and 10 g of water was heated to 60°C for 90 min. under stirring in an argon atmosphere. After washing and drying, 1.26 g of the bead copolymer was obtained.

EXAMPLE 7

A dispersion consisting of 0.90 g of EMBS, 0.90 g of hydroxyethyl methacrylate, 0.20 g of EDMA, 200 mg of ABIN, 10 mg of PVA, and 8 g of water was polymerized under argon at 60°C for 10 min. The yield was 1.88 g of the bead copolymer.

EXAMPLE 8

A dispersion consisting of 0.90 g of hydroxyethoxyethyl methacrylate benzenesulfo ester, 0.45 g of acrylamide, 0.15 g of EDMA, 150 mg of ABIN, 10 mg of PVA, and 8 g of water was polymerized under stirring in an argon atmosphere at 60°C for 10 min. The yield was 0.93 g of the bead copolymer.

EXAMPLE 9

A mixture consisting of 6.38 g of EMTS, 0.64 g of EDMA and 0.32 g of ABIN was degased in vacuo and polymerized between glass plates by the UV light irradiation at 30°C. The foils obtained were washed in acetone and ethanol and dried in vacuo. Their thickness was 20 to 100 $\mu$m.

EXAMPLE 10

A mixture consisting of 3.15 g of EMBS, 0.32 g of EDMA and 0.16 g of ABIN was worked out as in Example 9. Transparent foils 20–100 $\mu$m thick were obtained.

EXAMPLE 11

A mixture consisting of 3.02 g of ethylene methacrylate methansulfonate, 0.31 g of EDMA and 0.21 g of ABIN was worked out as in Example 9. The foil thickness was 20–100 $\mu$m.

EXAMPLE 12

A mixture consisting of 1.8 g of hydroxyethoxyethyl methacrylate benzenesulfo ester, 1.2 g of EDMA, 4.0 ml of toluene, 0.30 g of ABIN and 30 mg of PVA was stirred at the temperature 60°C in 30 ml of water under argon for 20 min. The resulting globules were washed with water and ethanol and dried. The yield was 97% of the globular material with the hydrolysis degree 2.9% as determined from the sulfur content and a fraction of 84 wt.% formed by particles with the size 0.25–0.125 mm.

EXAMPLE 13

A mixture consisting of 7.8 g of EMTS, 5.2 g of EDMA, 18 ml of toluene, 0.70 g of ABIN and 0.16 g of PVA was stirred in 130 ml of water at 70°C for 25 min. The resulting globules were obtained in the yield of 90%, had the hydrolysis degree 13.2%, contained 89% of particles with the size 0.25 = 0.125 mm and exhibited the pore volume 55%.

The advantage of the polymers prepared according to this invention consists in a possibility to prepare the reactive polymers having the form suitable for technical applications (especially bead polymers and membranes), which are then subjected to the corresponding reaction, so that very different functional derivatives are obtained from the common stable precursor, which are suitable above all for sorption and separation processes such as the elution chromatography, gel permeation chromatography, gas chromatography, thin-layer chromatography, and the like.

We claim:

1. A chemically reactive polymer of polymerized hydroxyalkylmethacrylate sulfo esters characterized by monomer units of the formula

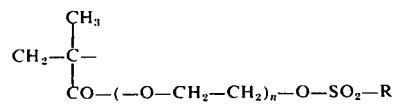

wherein $n$ is an integer equal to 1 or 2 and R is selected from the group consisting of $C_6H_5-$, $p-CH_3C_6H_4-$ and $CH_3-$.

2. A chemically reactive polymer according to claim 1 wherein said sulfo ester is ethylenemethacrylate benzene sulfonate.

3. A chemically reactive polymer according to claim 1 wherein said sulfo ester is ethylenemethacrylate toluene sulfonate.

4. A chemically reactive polymer according to claim 1 wherein said sulfo ester is ethylenemethacrylate methane sulfonate.

5. A chemically reactive polymer according to claim 1 wherein said sulfo ester is hydroxyethoxyethylmethacrylate benzene sulfo ester 6. A chemically reactive polymer according to claim 1 containing at acrylamide, one copolymerizable monomer selected from the group consisting of styrene, lower alkyl ($C_1$–$C_4$) methacrylates, lower alkyl ($C_1$–$C_4$) acrylates, hydroxyethylmethacrylate, acrlamide, methacrylamide, acrylonitrile and methacrylonitrile, in copolymerized form.

7. A chemically active polymer according to claim 6 wherein said sulfo ester is ethylenemethacrylate toluene sulfonate and said copolymerizable monomer is styrene.

8. Method of preparing a polymer according to claim 1 which comprises polymerizing an ethylenemethacrylate sulfo ester of the formula

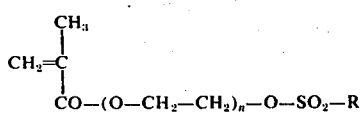

wherein $n$ and R are as above defined in the presence of an azo or peroxide free radical liberating initiator, at a temperature of less than 60°C. and under conditions whereby hydrolysis of the sulfo ester is suppressed.

9. Method of preparing a polymer according to claim 6 which comprises copolymerizing said sulfo ester and copolymerizable comonomer in the presence of an azo or peroxide free radical liberating initiator at a temperature of less than 60°C. and under conditions whereby the hydrolysis of the sulfo ester is suppressed.

10. Method according to claim 9 wherein there is additionally present a crosslinking agent.

11. Method according to claim 9 wherein there is additionally present a chain transfer agent.

* * * * *

Notice of Adverse Decision in Interference

In Interference No. 99,511, involving Patent No. 3,959,236, J. Peska, M. Benes, and J. Stamberg, POLYMERS AND COPOLYMERS OF HYDROXYALKYL METHACRYLATE SULFO ESTERS AND THE METHOD FOR THEIR MANUFACTURING, final judgment adverse to the patentees was rendered Mar. 25, 1983, as to claims 1, 3, 6 and 7.

[*Official Gazette November 8, 1983.*]